US012458251B2

(12) United States Patent
Yu et al.

(10) Patent No.: US 12,458,251 B2
(45) Date of Patent: Nov. 4, 2025

(54) INTEGRATED SWEAT SENSING SYSTEM FOR HEALTH STATUS MONITORING AND SAFETY WARNING

(71) Applicant: City University of Hong Kong, Hong Kong (CN)

(72) Inventors: Xinge Yu, Hong Kong (CN); Yiming Liu, Hong Kong (CN); Xingcan Huang, Hong Kong (CN)

(73) Assignee: City University of Hong Kong, Hong Kong (CN)

( * ) Notice: Subject to any disclaimer, the term of this patent is extended or adjusted under 35 U.S.C. 154(b) by 482 days.

(21) Appl. No.: 18/060,634

(22) Filed: Dec. 1, 2022

(65) Prior Publication Data

US 2024/0180447 A1 Jun. 6, 2024

(51) Int. Cl.
*A61B 5/00* (2006.01)
*A61B 5/145* (2006.01)
(Continued)

(52) U.S. Cl.
CPC ...... *A61B 5/14517* (2013.01); *A61B 5/14532* (2013.01); *A61B 5/14539* (2013.01);
(Continued)

(58) Field of Classification Search
CPC ............ A61B 5/14517; A61B 5/14532; A61B 5/14539; A61B 5/1477; A61B 5/6831; A61B 5/6832; A61B 5/742; A61B 5/7455; A61B 10/0064; A61B 2560/0443; A61B 2562/164; A61B 2562/166; A61B 5/01;
(Continued)

(56) References Cited

U.S. PATENT DOCUMENTS 9,579,024 B2 * 2/2017 Nyberg ............. A61B 10/0064
11,819,871 B2 * 11/2023 Andrinal Lopez .. A44C 5/0007
(Continued)

FOREIGN PATENT DOCUMENTS

WO WO-2013126774 A2 * 8/2013 ............. G01N 33/53
WO WO-2017058806 A1 * 4/2017 ......... A61B 5/14517

OTHER PUBLICATIONS

Gidado et al., "Review of Advances in the Measurement of Skin Hydration Based on Sensing of Optical and Electrical Tissue Properties", Sep. 21, 2022, Sensors 2022, 27 pages. (Year: 2022).*

*Primary Examiner* — Tse W Chen
(74) *Attorney, Agent, or Firm* — S&F/WEHRW

(57) ABSTRACT

The present invention provides an integrated sweat sensing system including a multi-layered structure incorporating a flexible circuitry sensing layer with multiple electronic and mechanical components responsible for sensing certain physiological changes of a user and giving feedback signals to the user when a detectable biological, chemical or physiological signal exceeds certain threshold. The system further includes a microfluidic based biosensing platform responsible for sensing changes in sweat component composition including ions, glucose and pH changes, and subsequently trigger feedback signal outputs from the flexible circuitry sensing layer to provide the user with a corresponding change-of-state signal. The present system is bendable and detachably mountable on various skin regions of the user.

18 Claims, 10 Drawing Sheets

(51) Int. Cl.
*A61B 5/1477* (2006.01)
*A61B 10/00* (2006.01)

(52) U.S. Cl.
CPC .......... *A61B 5/1477* (2013.01); *A61B 5/6831* (2013.01); *A61B 5/6832* (2013.01); *A61B 5/742* (2013.01); *A61B 5/7455* (2013.01); *A61B 10/0064* (2013.01); *A61B 2560/0443* (2013.01); *A61B 2562/164* (2013.01); *A61B 2562/166* (2013.01)

(58) Field of Classification Search
CPC ... A61B 5/4266; A61B 5/6833; A61B 5/0531; A61B 5/14546; A61B 5/1486; A61B 2562/125; H05K 3/00; H05K 3/188; H05K 3/34
See application file for complete search history.

(56) References Cited

U.S. PATENT DOCUMENTS

| | | | |
|---|---|---|---|
| 2010/0147065 A1* | 6/2010 | Tan | E21B 49/0875 73/152.24 |
| 2017/0156641 A1* | 6/2017 | Nyberg | A61B 5/6833 |
| 2019/0008448 A1* | 1/2019 | Begtrup | G01N 33/48792 |
| 2019/0246959 A1* | 8/2019 | Ionescu | A61B 10/0064 |
| 2020/0155047 A1* | 5/2020 | Rogers | A61B 5/1477 |
| 2022/0238220 A1* | 7/2022 | Konrad | A61B 5/6803 |

* cited by examiner

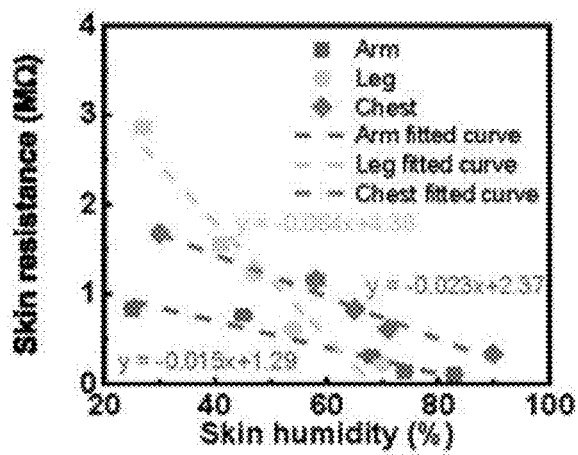 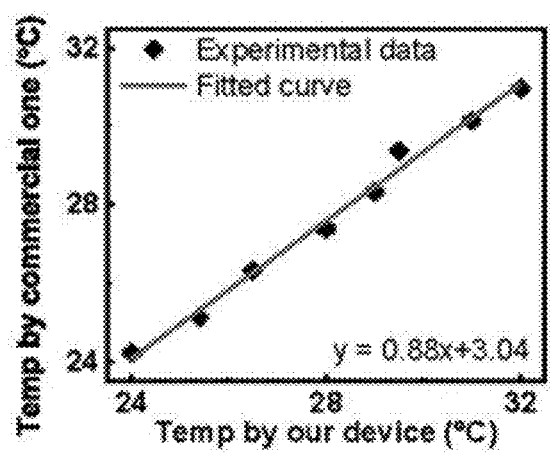
FIG. 2E
FIG. 2F
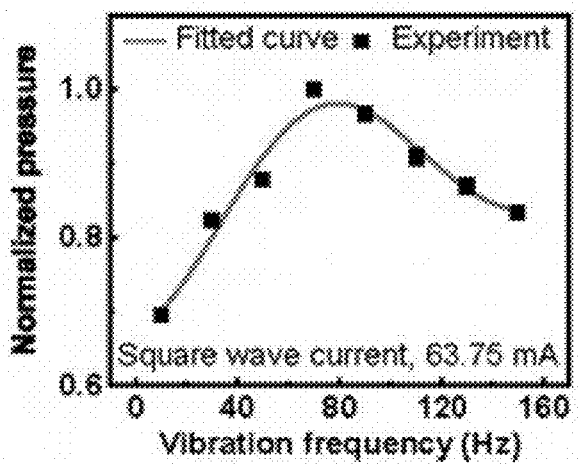 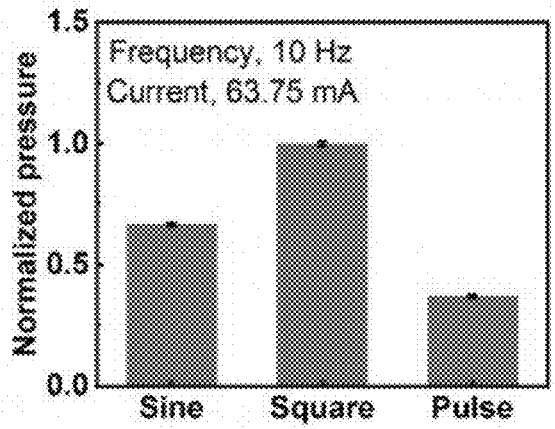
FIG. 2G
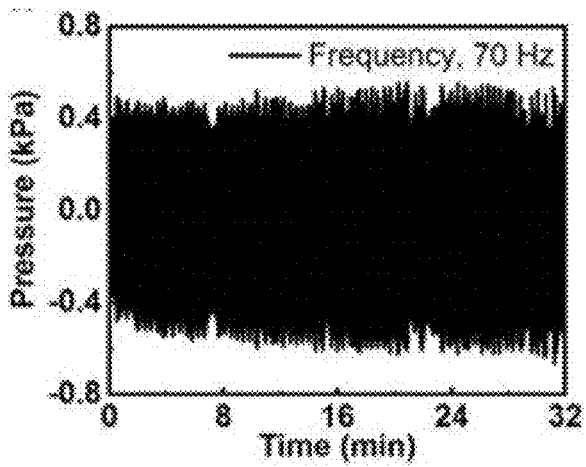 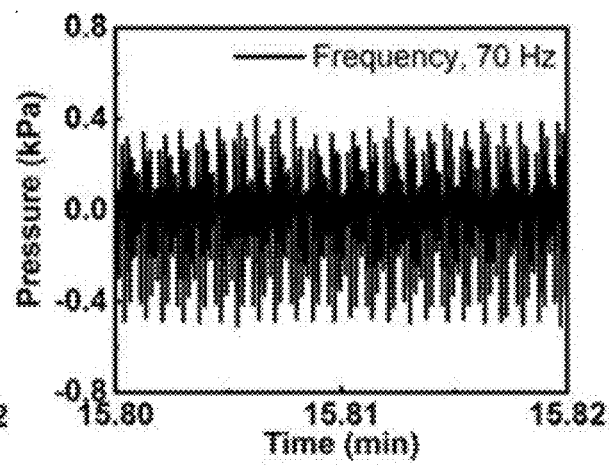
FIG. 2H
FIG. 2I

INTEGRATED SWEAT SENSING SYSTEM FOR HEALTH STATUS MONITORING AND SAFETY WARNING

TECHNICAL FIELD

The present invention relates to an integrated sweat sensing system for health status monitoring and safety warning, in particular, a wearable, integrated sweat sensing system to detect change(s) in composition of different sweat components and other physiological changes of an individual.

BACKGROUND

In modern society, personal health is a key aspect in our daily life many people are concerned about, which creates a lot of market potential. Therefore, many consumer products have been implanted with functions directed to tracking or even analyzing health related data received from individuals. Since biofluids such as sweat contain numerous biomarkers reflecting health conditions of an individual, for instance, $Na^+$ is responsible for regulating acid-base balance and maintaining muscle and cardiac functions; glucose in sweat is indicative of blood glucose content in human body, some recent studies have focused on different flexible and sensitive biosensors for detecting multiple sweat components such as $Na^+$, $Cl^-$, $K^+$, $NH4^+$, glucose, pH, lactate, etc. Integration of these biosensors in a wearable device can provide an alternative, non-invasive, and real-time platform to monitor health condition of an individual. In order to integrate multiple biosensors in a single wearable device for sweat sensing, at least the following features should be taken into account: (a) a flexible substrate for conformably mounting onto curved human skin and allowing the sensing components to build thereon; (b) a multiple sensing mechanism allowing major chemicals sensing in sweat and processing mechanism capable of providing comprehensive health assessment in real-time; (c) a spontaneous alarming system providing simultaneous reminder to users when detecting abnormal physiological signals during sweat monitoring; (d) a well-designed microfluidics as an interface between human skin and biosensors for fast leading fresh sweat to target sensors areas spontaneously.

One of the challenges most of the conventional skin-integrated biosensors are facing is how to avoid false sensing or interpretation of different biomarkers from the sweat. Giving an accurate health assessment becomes a big hurdle in developing into the next generation of wearable sweat sensor. Another challenge is how to provide an effective sampling and sensing platform while flexibility and durability of the platform are not compromised.

A need therefore exists for an improved integrated system having multiple sensing mechanisms and mapping functionality suitable for sensing complex biofluids such as sweat, that at least diminishes or eliminates the disadvantages and problems described above.

SUMMARY OF INVENTION

Accordingly, a first aspect of the present invention provides a flexible, human skin detachably mountable, integrated sensing system for simultaneously differentiating multiple sweat components in order to provide a real-time monitoring and assessment of health status of an individual. The present system is a multi-layered assembly comprising, from the most proximal layer to a contact surface of the human skin:
an adhesive layer for enhancing adhesion of the system to the human skin;
a sensing layer comprising:
  a flexible printed circuit board (FPCB), on which a plurality of electronic and mechanical components is disposed comprising at least a mechanical actuator for outputting a vibrating signal to the user, a microcontroller (MCU), and a plurality of feedback signal outputs each generating at least two opposing visual, audio or audio-visual signals representing at least two different states of each corresponding detectable biological, chemical or physiological signal by a corresponding biosensor; and
  a biomarker sensing platform having a plurality of biosensors associated with an electrode layer and a microfluidics where the microfluidics comprises a plurality of microchambers, a microfilter being an interface between the microfluidics and human skin contact surface, and a plurality of microchannels connecting corresponding microchambers together and connecting microchambers with the microfilter; and an encapsulation layer.

In certain embodiments, the biomarker sensing platform is configured to be flexible, bendable, and detachably mountable on the contact surface of human skin.

In certain embodiments, the biomarker sensing platform is integral to the FPCB forming a continuous layer with a circuitry region (or control panel) of the FPCB on which the plurality of electronic and/or mechanical components are soldered.

In other embodiments, the biomarker sensing platform is detachably connected to the circuitry region of the FPCB forming an extension of the sensing layer.

In certain embodiments, the electrode layer of the biomarker sensing platform is made of two metals and patterned.

Preferably, the electrode layer of the biomarker sensing platform is made of gold and chromium (Au/Cr).

In certain embodiments, the electrode layer of the biomarker sensing platform is supported by a substrate which is flexible, bendable and also durable.

Preferably, the supporting substrate of the biomarker sensing platform is made of the same material as that for forming a substrate of the FPCB.

Preferably the supporting substrate of the biomarker sensing platform and the FPCB substrate are both made of polyimide (PI).

In certain embodiments, each of the microchambers has a hydrophilic interior surface to increase the flow rate of the sweat obtained from the human skin contact surface via the plurality of microchannels towards the corresponding biosensors.

Preferably, the interior surface of the microchambers is deposited with polyvinyl alcohol followed by plasma treatment.

In certain embodiments, the biosensors are formed on the patterned electrode layer by an initial electrodeposition of platinum black, polyaniline (PANI) and poly(3,4-ethylenedioxythiophene)-poly (styrenesulfonate) (PEDOT:PSS), respectively, to form different membranes or coatings on the patterned electrodes, followed by subjecting different patterned electrodes to corresponding mixtures to form either an ion-selective membrane for sensing a corresponding ion or a sensing electrode for sensing glucose.

Preferably, the mixture for forming the sensing electrode for sensing glucose includes glucose oxidase (GOx), chitosan, and carbon nanotubes, and said mixture is deposited on one of the electrodes with a platinum black layer.

Preferably, the ion-selective membrane for sensing $NH^{4+}$ ions is formed on a corresponding electrode with PEDOT:PSS coating by an ion-selective solution containing nonactin, sodium tetrakis [3,5-bis(trifluoromethyl)phenyl] borate (Na-TFPB), polyvinyl chloride (PVC), and bis(2-ethylhexyl) sebacate (DOS) dissolved in tetrahydrofuran.

Preferably, the ion-selective membrane for sensing $Na^+$ is formed on a corresponding electrode with PEDOT:PSS coating by an ion-selective solution containing sodium ionophore X, sodium tetrakis [3,5-bis(trifluoromethyl)phenyl] borate (Na-TFPB), polyvinyl chloride (PVC), and bis(2-ethylehexyl) sebacate (DOS) dissolved in tetrahydrofuran.

Preferably, the electrode with a PANI membrane serves as a pH sensor.

In certain embodiments, the microfluidics of the biomarker sensing platform is made of a thermosetting polymer and fabricated based on photolithography.

Preferably, the thermosetting polymer for forming the microfluidics of the biomarker sensing platform is polydimethylsiloxane (PDMS).

In certain embodiments, a replica mold is provided by patterning a photoresist on a silicon wafer, followed by UV exposure under photomasking and removal of unmasked photoresist to form a patterned mold substrate, depositing an anti-adhesion layer thereon, followed by injecting a mixture of PDMS monomers with curing agent into cavities of the patterned mold substrate in order to form the microchambers, microfilter and microchannels of the microfluidics of the biomarker sensing platform.

In certain embodiments, the plurality of microchannels have an average channel width of about 15 μm.

In certain embodiments, the plurality of microchambers is five cylindrical chambers having an average diameter of about 2 mm and being connected to each other through the microchannels.

In certain embodiments, the microfilter is an array of micropillars each having a height of about 20 μm, a side length of about 40 μm, a center-to-center distance between two adjacent micropillars of about 90 μm, and a gap distance between each micropillar and the sidewall of its adjacent microchannel is about 18 μm.

Preferably, the array of micropillars contains at least ten micropillars and is disposed at an inlet of the microfluidics.

The number of micropillars, microchannels, and microchambers, and/or their dimension may vary according to the needs.

In certain embodiments, the PDMS-based microfluidics and the PI-based supporting substrate of the biomarker sensing platform are bonded using oxygen plasma treatment.

In certain embodiments, the mechanical actuator comprises two copper coils, each attached with a polyethylene terephthalate (PET) film, and two PET films seal a magnet enclosed by an epoxy ring, thereby forming a bilateral electromagnetic coil structure.

In certain embodiments, the plurality of feedback signal outputs is a plurality of light emitting diodes (LEDs) each generating two opposing light signals representing two different states of each corresponding detectable biological, chemical or physiological signal by a corresponding biosensor.

In certain embodiments, the electronic and/or mechanical components further comprise a temperature sensor, an impedance sensor, an amplifier, a crystal oscillator, resistors, capacitors, and an internal battery.

In certain embodiments, on two opposite sides of the sensing layer adjacent to where the biomarker sensing platform is integrated or detachably connected thereto, the present integrated sweat sensing system further comprises at least two elastic strips each being affixed on each of the two opposite sides of the sensing layer for securing the system to the contact surface of the human skin.

In certain embodiments, the encapsulation layer is configured to enclose at least a top surface of the sensing layer and the electronic and/or mechanical components disposed thereon.

Preferably, the encapsulation layer is made of a thermosetting polymer including PDMS.

In certain embodiments, the adhesive layer is a replaceable adhesive layer composed of one or more conductive double-sided adhesive tapes where one side of the double-side adhesive tapes adheres to the human skin contact surface and the other side thereof adheres to a bottom surface of the sensing layer.

A second aspect of the present invention provides a real-time and non-invasive method for monitoring physiological changes of an individual at various states, comprising:

securing the integrated sweat sensing system described in the first aspect or according to various embodiments of the present invention on one or more skin regions;

activating a power supply of the integrated sweat sensing system;

calibrating each of the biosensors of the biomarker sensing platform with a referenced reading of a biological, chemical, or physiological signal in order to pre-set a threshold value or range of said biological, chemical or physiological signal;

determining a first state of the individual from one of the two opposing signals as a first feedback signal given by one of the feedback signal outputs according to the pre-set threshold value or range;

if a corresponding detectable biological, chemical or physiological signal by the corresponding biosensor exceeds the pre-set threshold value or range, a second feedback signal in terms of the other one of the two opposing signals by the feedback signal outputs being generated and received by the individual, verifying a second state of the individual; and a simultaneous vibrational signal being generated by the at least a mechanical actuator together with the generation of the second feedback signal when said corresponding detectable biological, chemical or physiological signal exceeds the pre-set threshold value or range.

In certain embodiments, the securing of the integrated sweat sensing system to the one or more skin regions of the individual is through the at least two strips attached to the sensing layer and the adhesive layer of the present system.

In certain embodiments, the biological, chemical, or physiological signals detectable by the corresponding biosensors includes ions, glucose, pH, temperature and humidity.

Preferably, the ions detectable by the corresponding biosensors include ammonium cations ($NH^{4+}$) and sodium ($Na^+$) ions.

In certain embodiments, the integrated sweat sensing system is configured to have an extended, microfluidic based sweat collection module from a circuitry region or control panel of the flexible printed circuit board (FPCB), which is coupled with an array of biosensors for a fast transfer of sweat collected on the individual's skin surface by the microfluidic structure to respective microchambers of the sweat collection module, where the microchambers are configured to match the positions where the biosensors are disposed on the patterned electrodes of the biomarker sensing platform for sensing changes in concentration of different ions, glucose and pH in the sweat as collected during a time course.

In certain embodiments, the FPCB is also incorporated with a few sensors for sensing other physiological change(s) of the individual including temperature and skin impedance during the time course.

Exemplarily, the changes in concentration of ions, glucose and pH of the sweat as collected are detectable real-time by electric responses in terms of voltage change of the corresponding sensing electrodes of the biosensors. Feedback signal may be generated by the feedback signal output if the change in voltage of the corresponding sensing electrodes exceeds the threshold value or range of a biological, chemical or physiological signal.

Preferably, humidity of one or more regions of the skin is detectable by the impedance sensor incorporated on the FPCB in terms of an inverse relationship between the impedance and the skin humidity.

In certain embodiments, the feedback signal can be outputted as a visual, audio, or audio-visual signal representing a change of state of the individual in terms of the change in composition of any sweat components.

Preferably, each pair of opposing signals is generated by a pair of light emitting diodes with opposing color emissions representing two different states of a biological, chemical or physiological signal detectable by the corresponding biosensor.

In certain embodiments, the one or more regions of skin include the skin of an upper arm, and the threshold ranges of detectable $NH_4^+$, $Na^+$, pH, glucose, skin impedance, and temperature from the sweat are 0.1-1 mM, 10-100 mM, 3-8, 10-200 µM, 0.07-0.91 MΩ, and 14-30° C., respectively.

In certain embodiments, the threshold ranges of skin impedance on skin regions of leg and chest of human subject are 0.34-1.68 MΩ and 0.08-2.63 MΩ, respectively.

Other aspects of the present invention include methods of fabricating the present integrated sweat sensing system. Details of each of the fabrication methods with respect to different parts of the present integrated sweat sensing system and their variations can be found in various embodiments and examples described herein, or any known methods to a person of ordinary skill in the art.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other aspects of the present invention are disclosed as illustrated by the embodiments hereinafter.

BRIEF DESCRIPTION OF DRAWINGS

The appended drawings, where like reference numerals refer to identical or functionally similar elements, contain figures of certain embodiments to further illustrate and clarify the above and other aspects, advantages and features of the present invention. It will be appreciated that these drawings depict embodiments of the invention and are not intended to limit its scope. The invention will be described and explained with additional specificity and detail through the use of the accompanying drawings in which:

FIGS. 1A-1E show a structure and appearance of an integrated sweat sensing system according to certain embodiments of the present invention, in which:

FIG. 1A schematically depicts the structure of the integrated sweat sensing system from an exploded perspective view;

FIG. 1B shows a schematic diagram of a sensing layer of the integrated sweat sensing system from a top perspective view and an optical image of the same from another top perspective view, in which a scale bar represents 1 cm, and a dashed line box indicates a biomarker sensing platform of the sensing layer;

FIG. 1C schematically depicts a structure of the biomarker sensing platform of the sensing layer as indicated by the dashed line box in FIG. 1B and shows images of a prototype of a detachable and flexible biomarker sensing platform;

FIG. 1D shows a series of images for a prototype of the integrated sweat sensing system (top left panel) and its appearances during implementation studies on the skin of various parts of a subject including arm (top right panel), leg (bottom left panel) and abdominal region (or tummy) (bottom right panel);

FIG. 1E shows an exploded view of an embodiment of mechanical actuator of the integrated sweat sensing system;

FIGS. 2A-2L shows characteristics of different biosensors and mechanical actuator in the integrated sweat sensing system according to certain embodiments of the present invention, in which:

FIG. 2A shows electrical responses of $NH_4^+$ biosensor;
FIG. 2B shows electrical responses of $Na^+$ biosensor;
FIG. 2C shows electrical responses of glucose biosensor;
FIG. 2D shows electrical responses of pH sensor;
FIG. 2E shows electrical responses of humidity sensor as a function of skin humidity at three different skin areas (arm, leg, and chest);

FIG. 2F shows a comparison of skin temperature of a human subject measured by a temperature sensor in the present system versus a commercial temperature measurement apparatus (temperature gun);

FIG. 2G shows operational performances of the mechanical actuator (with a thickness of 2.8 mm) under an increasing vibrational frequency (left panel) and normalized pressure induced by the actuator under different types of current input, including sine, square, and pulse, at the constant frequency and current amplitude of 10 Hz and 63.75 mA (right panel);

FIG. 2H shows cycling performances of the mechanical actuator under a power input of 63.75 mA for 134400 testing cycles;

FIG. 2I an enlarged view within certain time interval of the result as in FIG. 2H;

FIG. 2J shows a temperature peak of the mechanical actuator as a function of operation time at a constant square-wave current of 63.75 mA with the duty ratio of 1:1;

FIG. 2K shows a thermal distribution image of the actuator embedded in the control panel for continuously operating over 80 s with the highest temperature of 43° C.;

FIG. 2L shows a theoretical analysis of the actuator as a distributed pressure is applied on the top surface. The result shows that the actuator could operate normal at a pressure of 7.52 MPa without any damage.

FIGS. 3A-3L show properties of the microfluidics and anti-interface capacity of different biosensors according to certain embodiments of the present system, in which:

FIG. 3A shows an image of the microfluidics of the biomarker sensing platform with a magnified view in an inset, where the scale bar for the image in lower magnification is 3 mm;

FIG. 3B shows images of three different sites with three different bending radius (1 cm, 1.7 cm and 2.5 cm) on which the microfluidics of the biomarker sensing platform as shown in FIG. 3A is mounted, where scale bar is 1 cm;

FIG. 3C shows images of the microfluidics of the biomarker sensing platform mounted on the three different sites as shown in FIG. 3B, in which skin debris indicated by arrows were filtered out under the three different bending conditions (scale bar=0.1 mm);

FIG. 3D shows filtration ratio of the microfluidics for filtering out standard microspheres under three different bending conditions as shown in FIG. 3B;

FIG. 3E shows occupation ratio of the sweat fulfilling in the microfluidics as a function of the operation time;

FIG. 3F shows a theoretical model simulating a generated sweat flow track in the chamber of the microfluidics;

FIG. 3G shows an anti-interface capacity of $NH_4^+$ sensor under interferences by NaCl, $NH_4Cl$ and KCl (each 1 mM) at different times over the course of the test;

FIG. 3H shows an anti-interface capacity of $Na^+$ sensor under interferences by NaCl, $NH_4Cl$ and KCl (each 20 mM) at different times over the course of the test;

FIG. 3I shows an anti-interface capacity of glucose sensor under interferences by NaCl, glucose and KCl (each 20 µM) at different times over the course of the test;

FIG. 3J shows an anti-interface capacity of pH sensor under interferences by NaCl, KCl and formic acid (each 30 µM) at different times over the course of the test;

FIG. 3K shows a comparison of electrical responses of the humidity (skin impedance) sensor before and after 1000 bending cycles at a constant bending angle and frequency of 60° and 1 Hz, respectively;

FIG. 3L shows a comparison of electrical responses of the temperature sensor before and after 1000 bending cycles at a constant bending angle and frequency of 60° and 1 Hz, respectively.

FIGS. 4A-4H show an implementation example of the present system and performances of different sensors mounted on human skin of the same site on three different test subjects, in which:

FIG. 4A shows images of one of the test subjects wearing the present system around his upper right arm for monitoring the sweat components concentration during running;

FIG. 4B shows electrical responses of the six biosensors ($NH_4^+$, $Na^+$, glucose, pH, humidity, and temperature) during a 20-min running exercise of the test subject shown in FIG. 4A;

FIG. 4C shows a variation of the readouts by the $NH4^+$ sensor mounted on three different sites (arm, chest, leg) of each of the three test subjects;

FIG. 4D shows a variation of the readouts by the $Na^+$ sensor mounted on three different sites (arm, chest, leg) of each of the three test subjects;

FIG. 4E shows a variation of the readouts by the glucose sensor mounted on three different sites (arm, chest, leg) of each of the three test subjects;

FIG. 4F shows a variation of the readouts by the pH sensor mounted on three different sites (arm, chest, leg) of each of the three test subjects;

FIG. 4G shows a variation of the readouts by the humidity (impedance) sensor mounted on three different sites (arm, chest, leg) of each of the three test subjects;

FIG. 4H shows a variation of the readouts by the temperature sensor mounted on three different sites (arm, chest, leg) of each of the three test subjects.

Skilled artisans will appreciate that elements in the figures are illustrated for simplicity and clarity and have not necessarily been depicted to scale.

DETAILED DESCRIPTION OF THE INVENTION

It will be apparent to those skilled in the art that modifications, including additions and/or substitutions, may be made without departing from the scope and spirit of the invention. Specific details may be omitted so as not to obscure the invention; however, the disclosure is written to enable one skilled in the art to practice the teachings herein without undue experimentation.

Figure 1A:
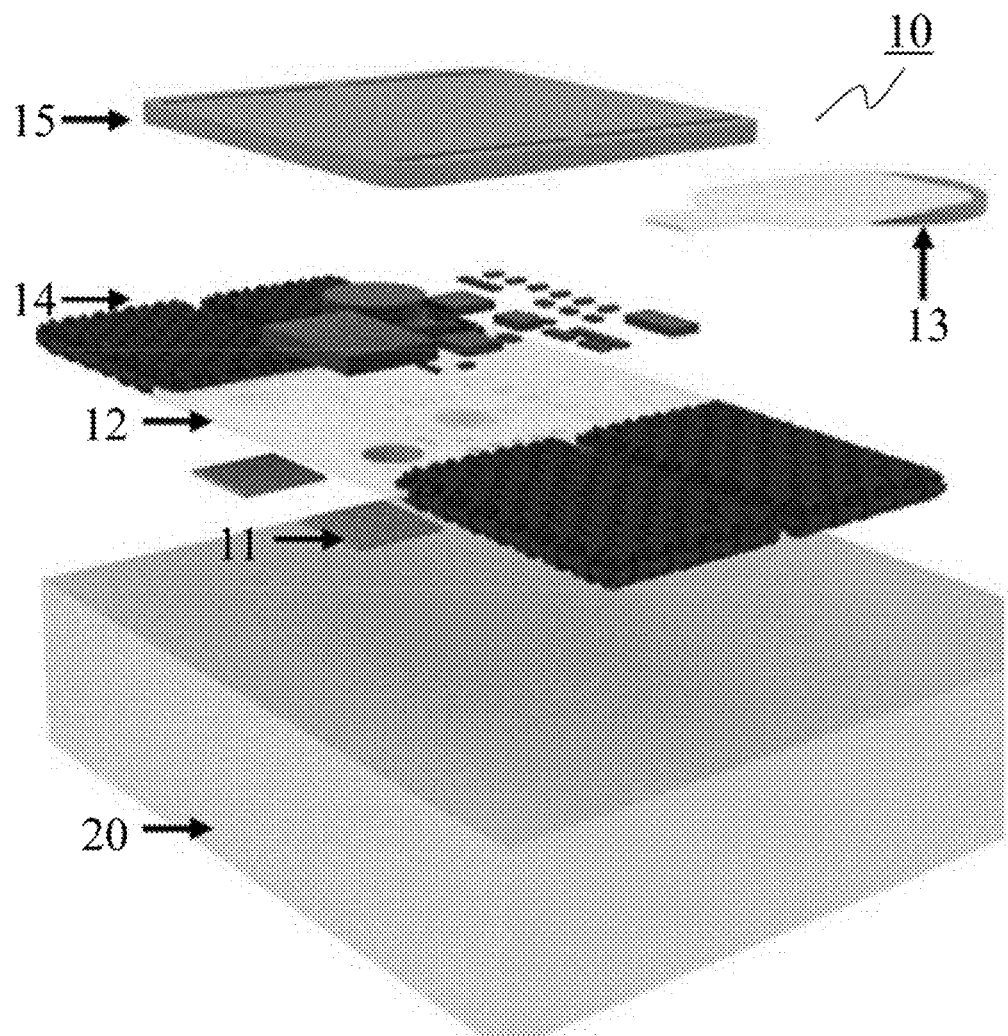
Figure 1B:
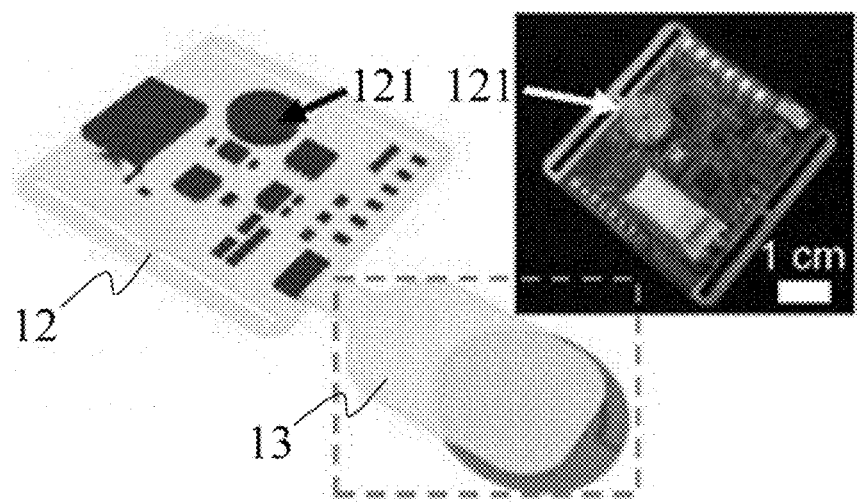
Figure 1C:
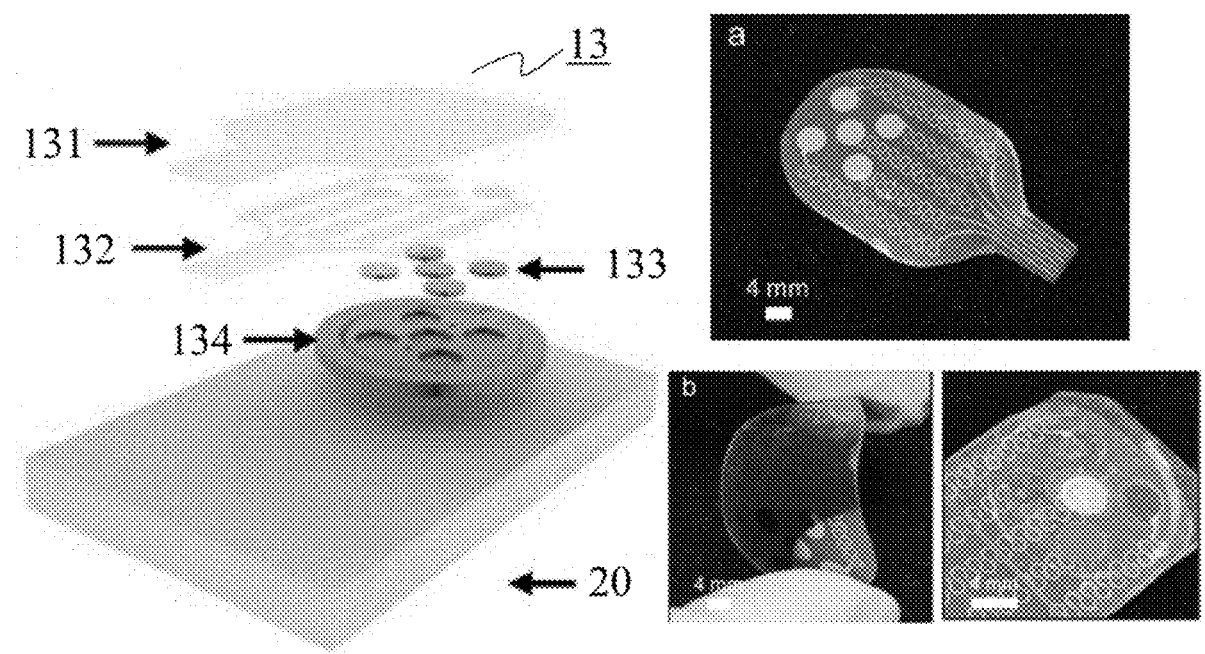

Turning to FIGS. 1A-1E, an integrated sweat sensing system 10 is provided. FIG. 1A schematically depicts the basic structure of the present integrated sweat sensing system 10 according to certain embodiments, which includes a thin encapsulation layer 15 that can be made of an elastic and biocompatible polymer such as polydimethylsiloxane (PDMS) to resist potential disturbance from various external stimuli; a sensing layer 12 including a flexible printed circuit board (FPCB) on which a series of electronic and mechanical elements and a mechanical actuator are soldered, serving as a control panel for data collection, processing, and feedback; a detachable, flexible chemical sensing platform 13 having a matched microfluidics for simultaneously detecting $NH_4^+$, $Na^+$, pH, and glucose concentrations in fresh sweat by a multiple-sensor array (three images in FIG. 1C show a prototype of the same); and a thin, replaceable adhesive layer 11 such as a double-side conductive tape to enhance the bonding between human skin 20 and the present system 10 for later skin impedance continuously monitoring. To decrease human motion effect on the multi-biosensor signals collected by the present system, four cloth-based strips 14 are adopted to fix the device onto the users' target skin areas. The number of strips can vary, depending on the requirements. To provide a simultaneous vibration-based feedback, a low energy-consumption (<0.2 W), miniaturized vibrotactile actuator based on a bilateral electromagnetic coils design (FIG. 1E), whose vibration intensity can be extensively enhanced through the coupled electromagnetic fields induced by two copper (Cu) coils 1211. A magnet 1213 is inserted into a hollow space of an epoxy ring 1214, then sealed by two PET films 1212. The two Cu coils 1211 are bonded on the two PET films 1212 in order to sandwich the sealed magnet 1213 in the ring 1214, forming an electromagnetic coil structure.

FIG. 1B shows the device layout with all the electronic elements soldered on the FPCB, including the mechanical actuator 121. In certain embodiments, the mechanical actuator has a diameter of 11 mm and thickness of 2.8 mm. the electronic elements include a microcontroller (MCU), six LEDs with two optional emitting colors (e.g., green and red), an amplifier, a crystal oscillator, resistors, capacitors, and an 80 mAh lithium-ion battery. In certain embodiments, the present system is configured to maintain a silent status with all LEDs emitting green light and the mechanical actuator static as all the detected physiological signals are in normal ranges, where the normal ranges of $NH_4^+$, $Na^+$, pH, glucose, skin impedance, and temperature are 0.1~1 mM, 10~100 mM, 3~8, 10~200 µM, 0.07~0.91 MΩ, 14~30° C., respectively, for human arms. These physiological signal ranges may vary from one site to the other site of measurement. When the signal of anyone of the biomarkers is out of the normal range at a particular site of measurement, the corresponding LED will turn to red with 10 s, meanwhile the vibration will be sequentially induced by the mechanical actuator for simultaneously warning users to take necessary actions, such as slowing down exercising intensity, drinking electrolyte-rich water, or taking a rest etc.

Figure 1D:
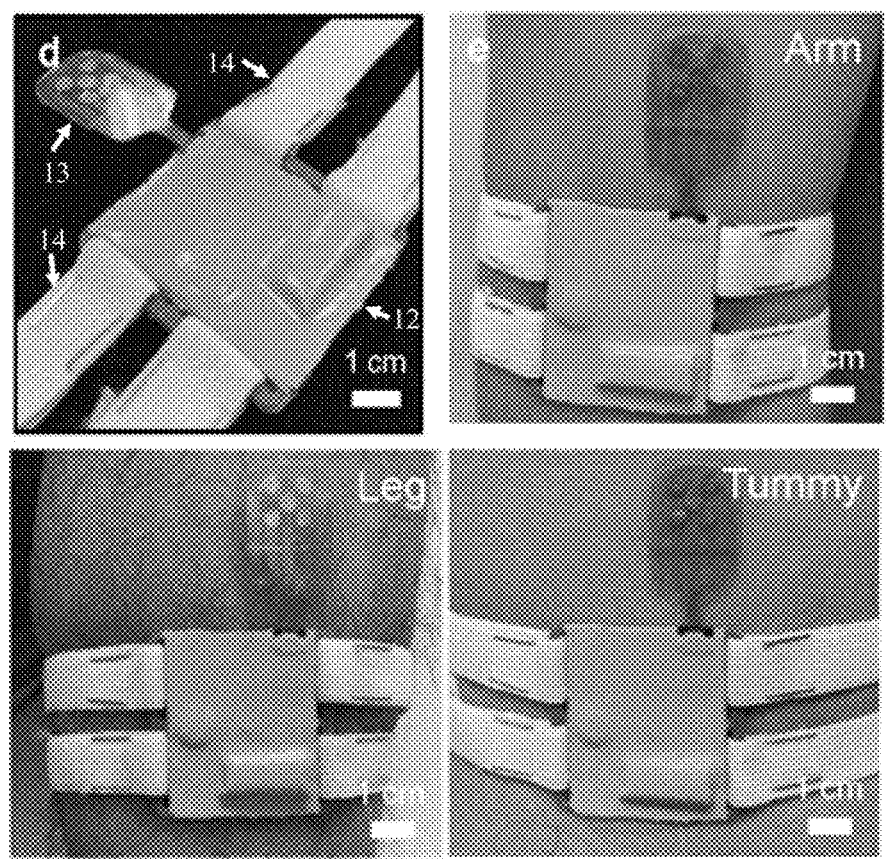

FIG. 1C shows an embodiment of a flexible, detachable biomarker platform with four biosensors (for sensing $NH_4^+$, $Na^+$, pH, and glucose, respectively) integrated into one patch. The biomarker platform 13 includes a substrate layer 131 such as a 150-μm polyimide (PI) layer as a supporting platform, an electrode layer 132 such as a 240-nm patterned electrode layer made of gold/chromium (Au/Cr, 200 nm/40 nm), four catalyst patches 133 serving as biosensors sensitive to $NH_4^+$, $Na^+$, pH and glucose, and a microfluidics 134 made from PDMS. By directly interfacing with human skin, the four sensors could accurately analyze the concentration of the corresponding sweat components in a short time through the high-performance microfluidics with a response time of less than 15 s. This advanced device layout and material selection offer great flexibility of the present system, that could be bent over 900 without any structure damage, and thus enables its applications in various human body locations, including arm, leg and tummy (FIG. 1D).

Figure 2A:
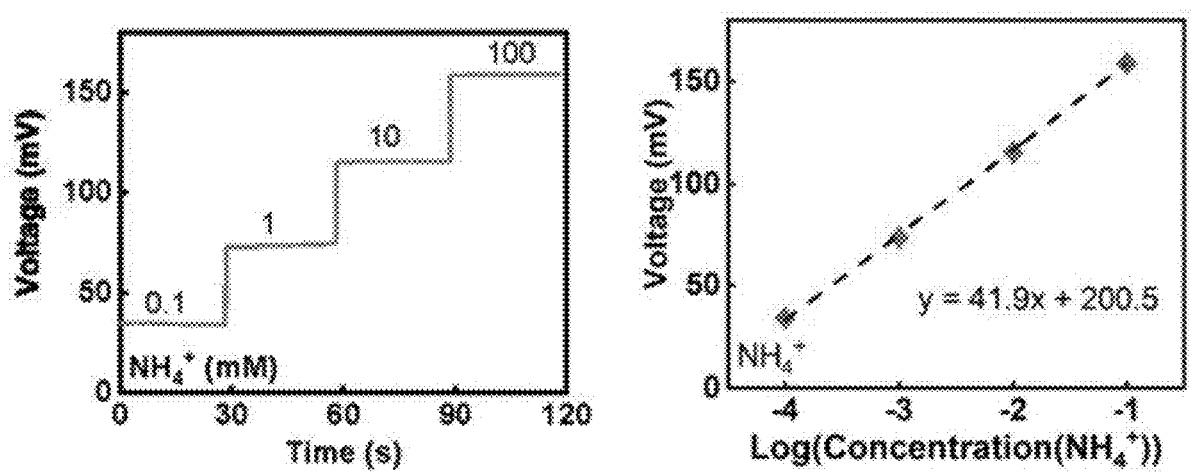
Figure 2B:
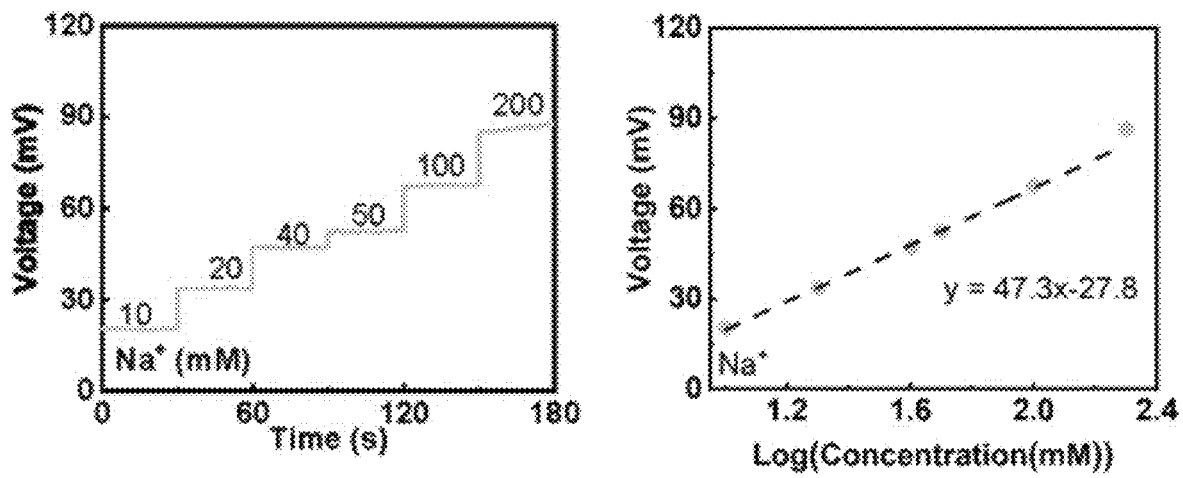
Figure 2C:
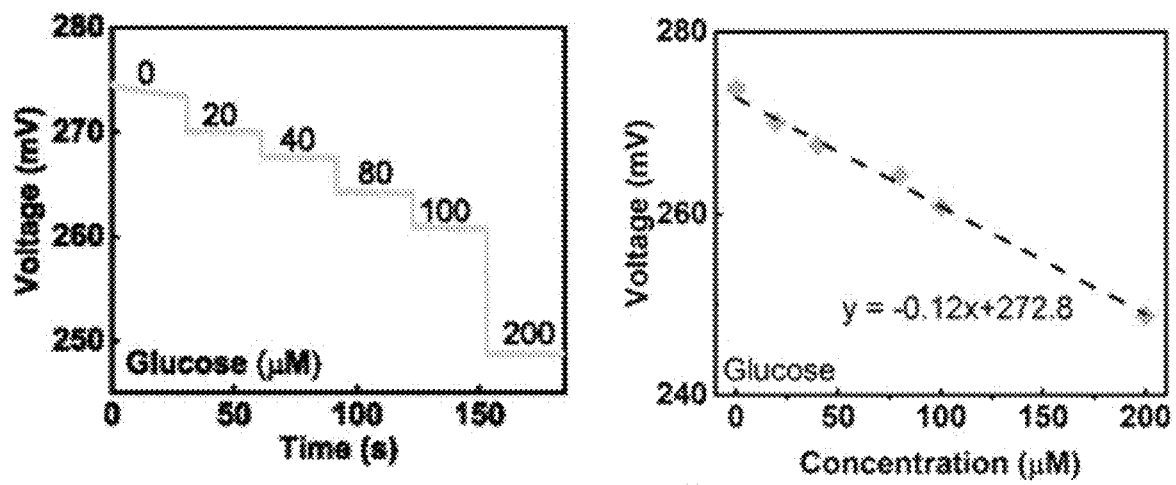
Figure 2D:
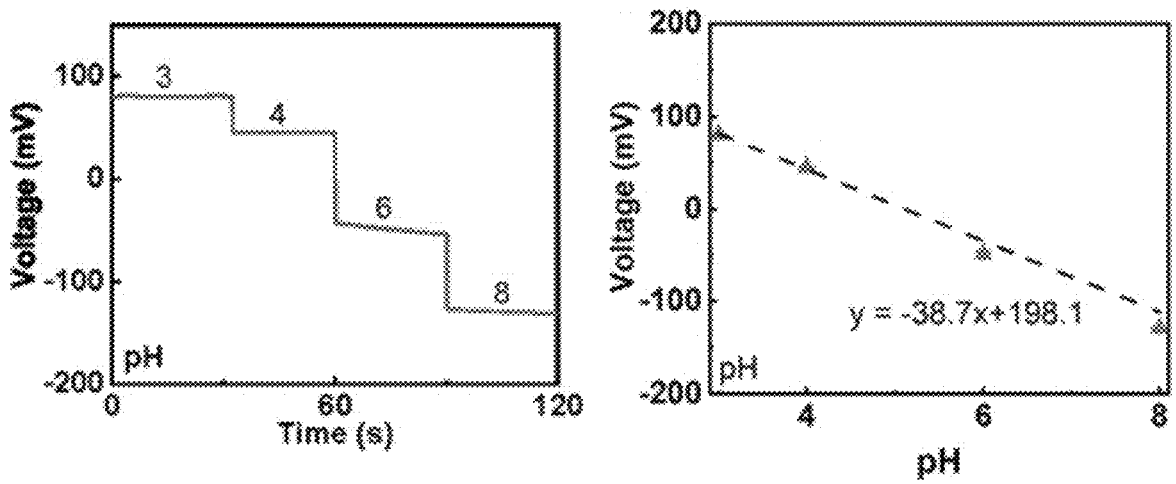
Figure 2J:
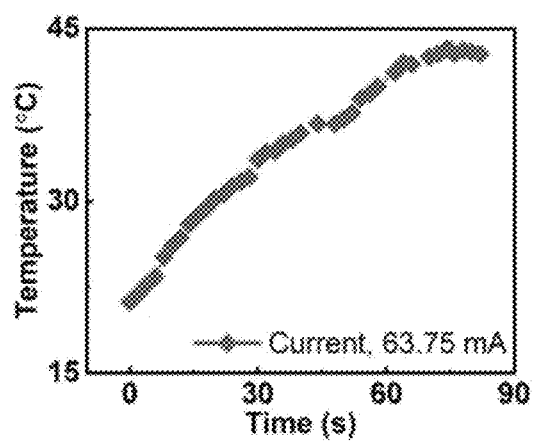

FIGS. 2A-2L show the electrical characteristics of the biosensors and the mechanical actuator. For the ion selective electrodes of $NH_4^+$ and $Na^+$, ion selective membranes with corresponding ionophores are applied as the sensing layer, while a layer of poly(3,4-ethylenedioxythiophene) (PEDOT): poly(sodium 4-styrenesulfonate) (PSS) layer is electrodeposited on electrodes as an ion-electron transducer to minimize the potential drift of the biosensors. As shown in FIG. 2A, the response of the $NH_4^+$ sensor is positively correlated with an increase in $NH_4^+$ concentration, and the corresponding sensor exhibits excellent linearity with a broad detection range from 0.1 mM to 100 mM. Similarly, the $Na^+$ sensor also shows an excellent sensing behavior for the $Na^+$ with physiologically relevant concentrations range of 10~200 mM (FIG. 2B). The glucose and pH sensors are prepared using a similar potentiometric sensing approach with glucose oxidase (GOx) and polyaniline (PANI) as the sensing components, respectively. FIGS. 2C and 2D illustrate the voltage responses of the glucose sensors and the pH sensors to various glucose concentrations (10 to 200 μM) and pH level (3 to 8), respectively. Both sensors show good linear performance in the range of physiologically relevant concentrations in sweat. FIG. 2E shows that the electrical response of a skin impedance sensor was measured as a function of skin humidity, which was also verified by a commercial skin humidity sensor at three human body locations, including arm, leg, and chest. It is found that the skin impedance detected by that sensor decreases linearly with an increasing skin humidity as 0.91~0.07 MΩ @25%~83% for arm, 1.68~0.34 MΩ @30%~90% for leg, and 2.63~0.08 MΩ @27%~67% for chest. Apart from the skin impedance sensor, the skin temperature was measured by a thermistor embedded in the electrical control panel. The thermistor-based temperature sensor can be calibrated by a commercial temperature sensor with the temperature ranging from 24° C. to 32° C., covering most application prospects in room temperature for users (FIG. 2F). The results show a comparable electrical performance of the sensor with the fitted curve slope factor of ~0.9.

FIGS. 2G-2I show the electrical characteristics of the mechanical actuator according to certain embodiments for a wearable version of the present system. To achieve a low energy-consumption property, operating the mechanical actuator at resonant frequency is required. FIG. 2G shows a normalized amplitude of the actuator as a function of operation frequencies from 10 Hz to 150 Hz at an interval of 30 Hz, where it can be clearly seen that the resonance peak is at 70 Hz with a maximum yielded pressure of 0.43 kPa at a constant square-wave current of 63.75 mA (left panel); right panel shows the normalized pressures of the actuator as a function of current input types, including sine wave, square wave, and pulse at the constant frequency and current amplitude of 63.75 mA, among which the square-wave current could generate much higher pressure than the other two types, which is due to the higher power input of the square wave at a same peak amplitude value. To verify the stability of that actuator, a long-term duration test of over 32 mins continuous operation at resonant frequency (70 Hz) is conducted for >105 working cycles, where the actuator is still very robust without any fatigue or damage (FIG. 2H). FIG. 2I shows the detailed electrical signals of the actuator during the long-term operation, further proving its high stability.

Figure 2K:
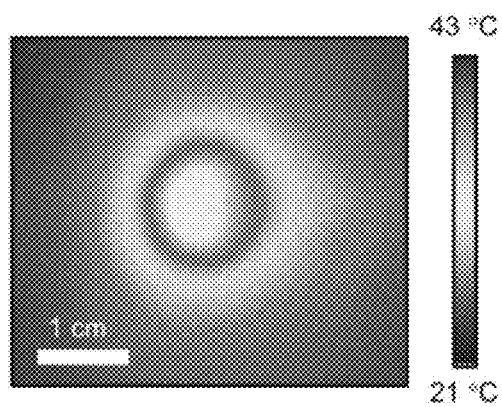
Figure 2L:
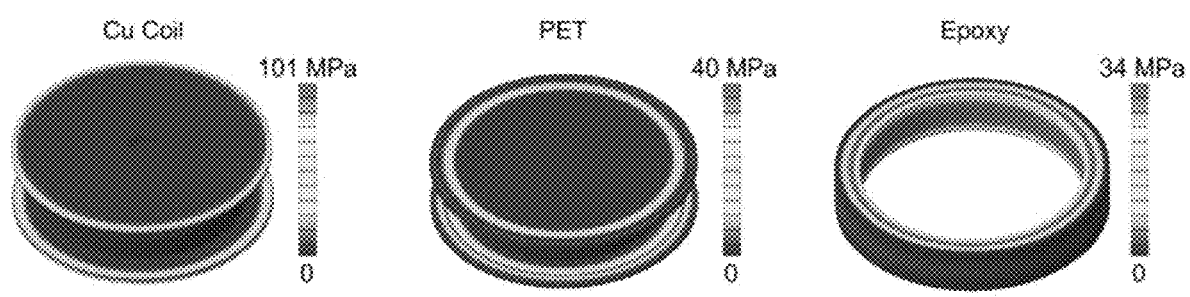

As much heat would be generated during the actuator's continuous operation, the temperature peak value of the actuator embedded in the control panel at the full-load working mode is monitored for over 80 s (FIG. 2J), and the result shows that the maximum temperature is 43° C., which is further verified by the thermal distribution image of the actuator in FIG. 2K. The highest temperature of the actuator (43° C.) could not induce any discomfort to users, which further proves its practicability. As a distributed force with pressure of 7.52 MPa applied on the top surface of the actuator, the PET layers start suffering from plastic deformations with the maximum pressure reaching up to 40 MPa (FIG. 2L).

Figure 3A:
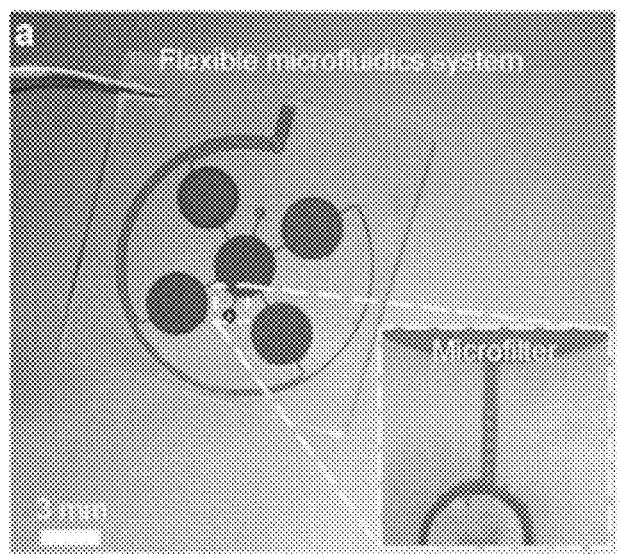
Figure 3B:
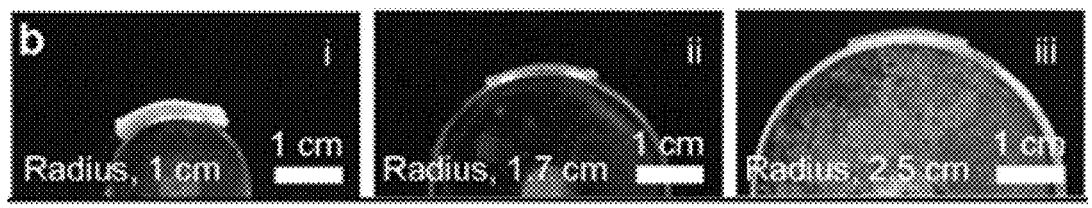
Figure 3C:
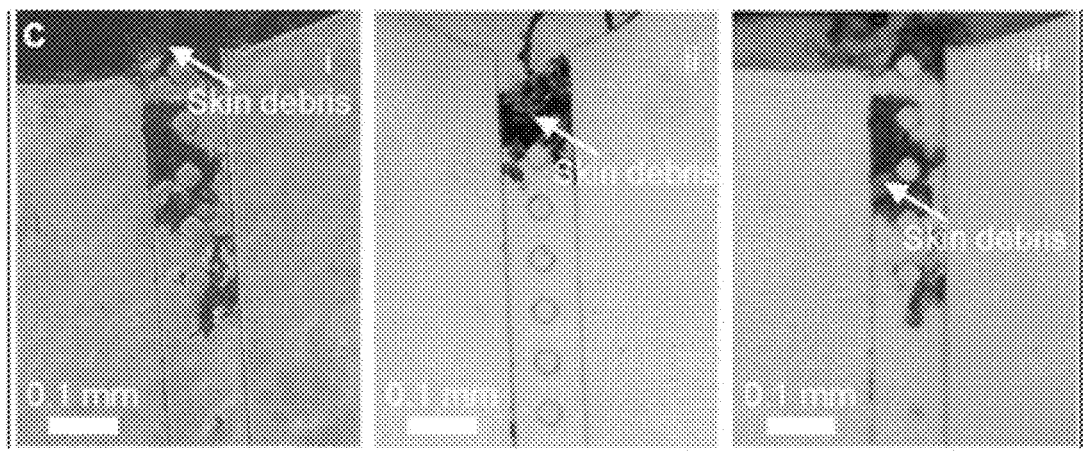
Figure 3D:
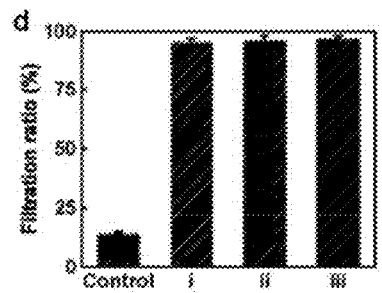
Figure 3E:
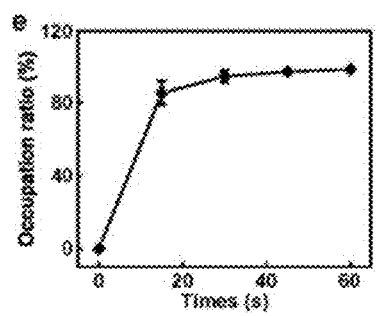
Figure 3F:
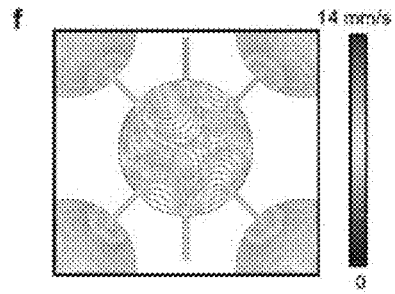
Figure 3G:
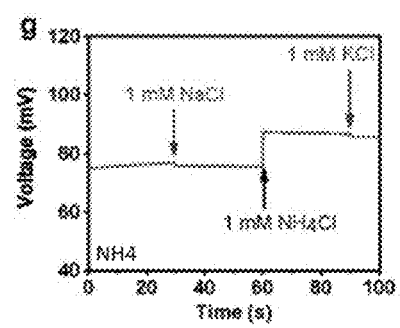
Figure 3H:
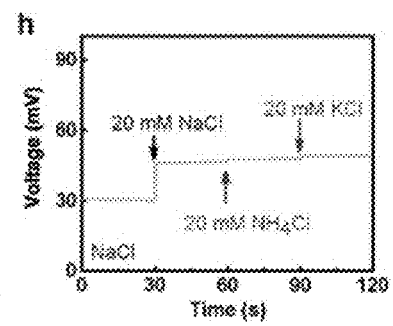
Figure 3I:
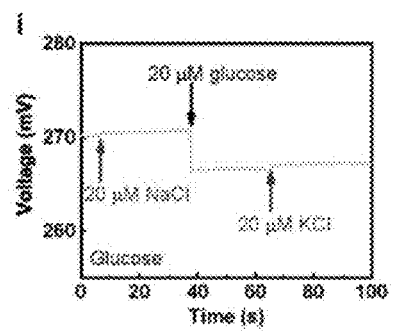
Figure 3J:
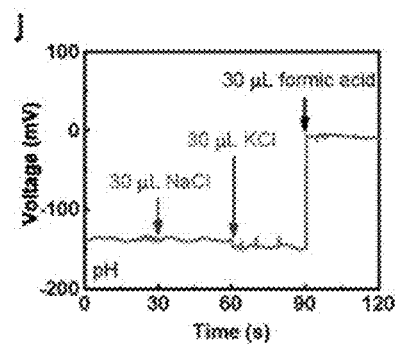

FIGS. 3A-3F show the characteristics of the microfluidics. As seen in FIG. 3A, the microfluidics according to certain embodiments includes two parts: microfilter (small inset) for sweat filtration, and microchamber for biomarker signal monitoring. In certain embodiments, the microfilter is integrated with a plurality of micropillars (e.g., 10 micropillars), where each micropillar may have the following dimension: height: 20 μm; side length: 40 μm; center to center distance: 90 μm; gap distance between micropillar and side wall of microchannel: 18 μm, disposed at the inlet to form a sweat filtration module. The microchamber for biomarker signal monitoring includes 5 cylinder-like chambers each with a diameter of about 2 mm and connected to each other through the microchannel (channel width: 15 μm). To investigate the effect of microfilter in the microchamber on minimizing biological sample contamination during sweat sampling, sweat samples from volunteer is subject to the microfilter. The microfluidic based sweat filtration module can apply to filtrate skin debris and microsphere with a diameter of ~20 μm when applied on cylinder with different curvatures (FIGS. 3B-3C). Microsphere with a diameter of 20 μm mixed in distill water is also used to verify the filtration function of the microfilter. As seen in FIG. 3D, nearly 95% microsphere can be filtrated, even under bending, as compared with control group, verifying that the microfluidics of the present invention can provide a stable performance of skin debris filtration when applied on different type of human interfaces such as forehead, elbow joint and so on. Since the sweat collection rate plays a key role in biomarker signal monitoring, the microchamber with a hydrophilic surface via a deposition of polyvinyl alcohol (PVA) followed by a plasma treatment is provided to enhance the collection rate. The occupation time for sweat fulfilled in five microchambers is calculated, where the sweat can cover up to 80% volume of each microchamber in 15 sec and ~100% thereof in 1 min (FIG. 3E). Streamline simulation for sweat flowing into the microchamber shows that the sweat collected from human can be homogenously distributed to the microchamber which indicates that the microfluidic based sweat collection module can provide an efficient sweat collection rate and decrease the interruption from skin debris (FIG. 3F).

FIGS. 3G-3J shows anti-interface capacity of the biosensors according to certain embodiments of the present invention for $NH_4^+$, $Na^+$, pH, and glucose, respectively. It is observed that there are only negligible fluctuations of voltage outputs in the sensors when interferences happen on the electrolyte by adding other electrolytes, while there are obvious responses by adding the corresponding electrolyte matching the sensors at the same concentration as the other electrolytes, demonstrating an excellent anti-interface capacity of these biosensors. The stable performance is mainly led by the specificity of corresponding sensing components of enzymes or ionophores.

Figure 3K:
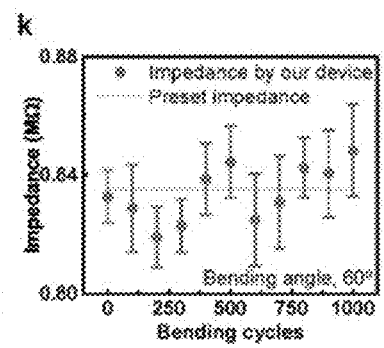
Figure 3L:
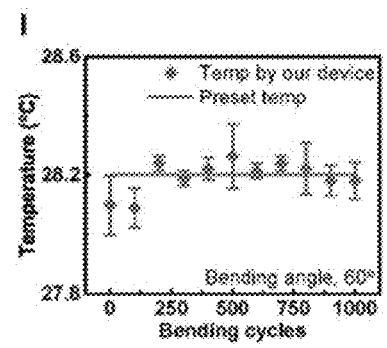

In terms of humidity and temperature sensing, FIGS. 3K and 3L show the electrical response of the skin impedance sensor and temperature sensor integrated in the control panel (circuitry region) of the FPCB under over 1000 bending cycles at a constant bending angle and frequency of 60° and 1 Hz, respectively. The results show that the two biosensors for skin impedance and temperature could still accurately detect corresponding physiological signals with the signals ranging from 0.819~0.848 MΩ @ the present value of 0.835 MΩ for the impedance sensor, and 28.1~28.3° C. @ the present value of 28.2° C. for the temperature sensor, which proves their high resistance to external stimuli.

Figure 4A:
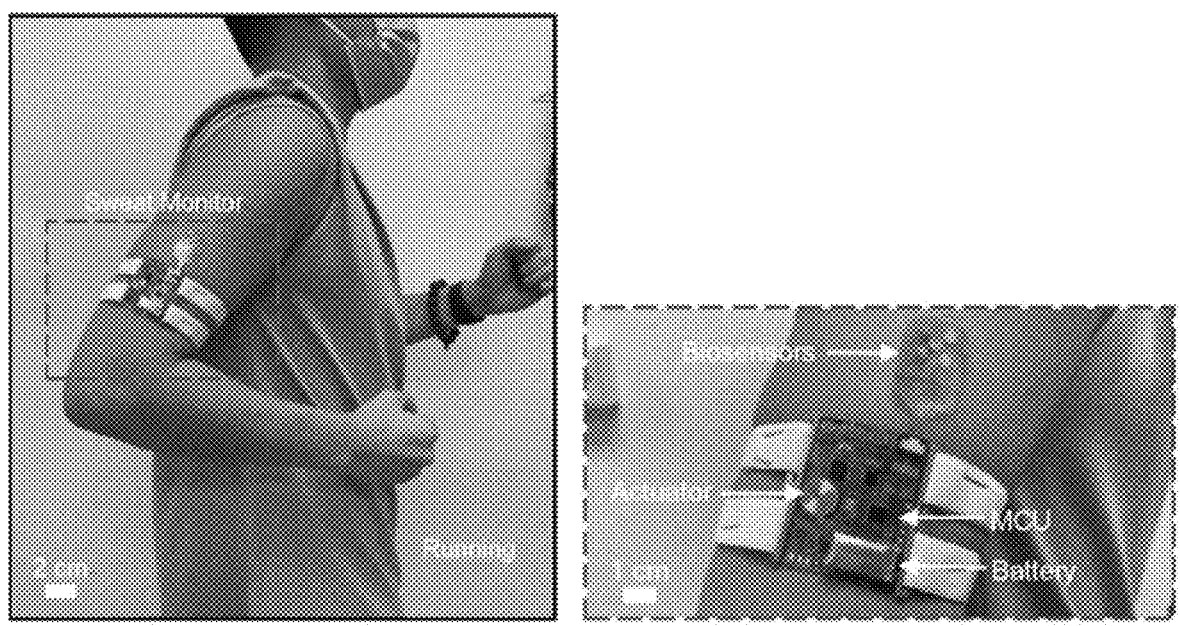
Figure 4B:
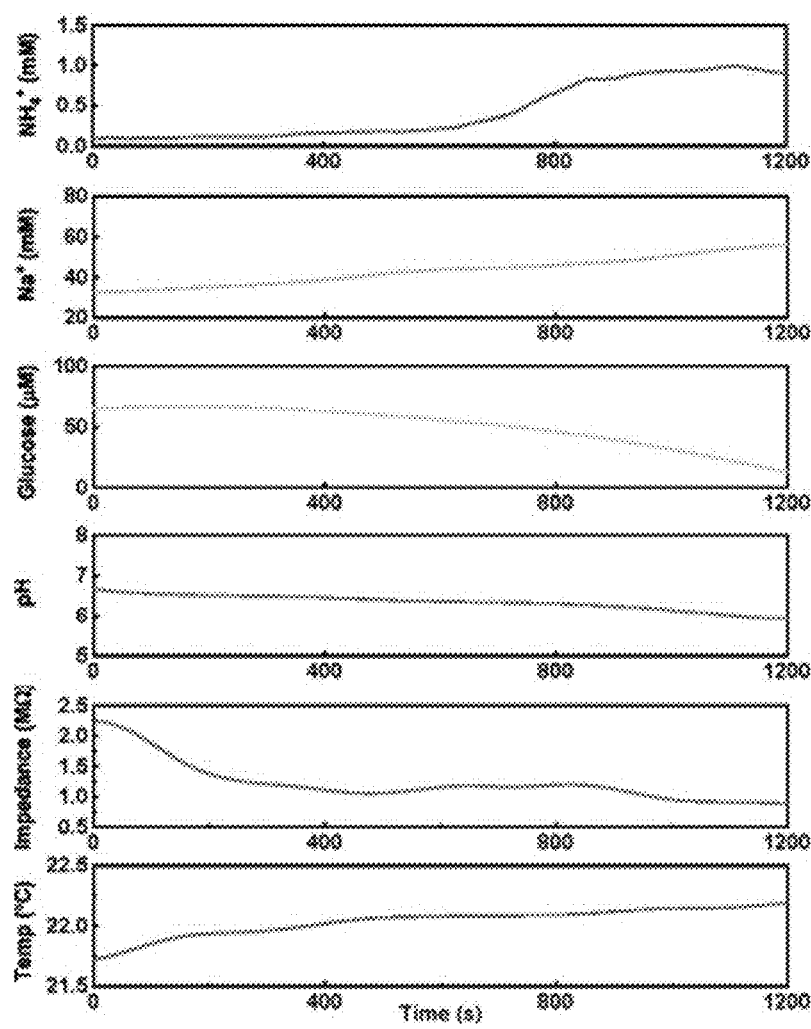
Figure 4C:
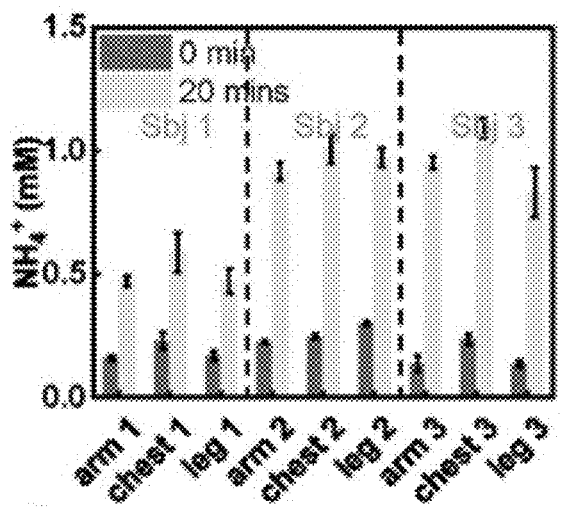
Figure 4D:
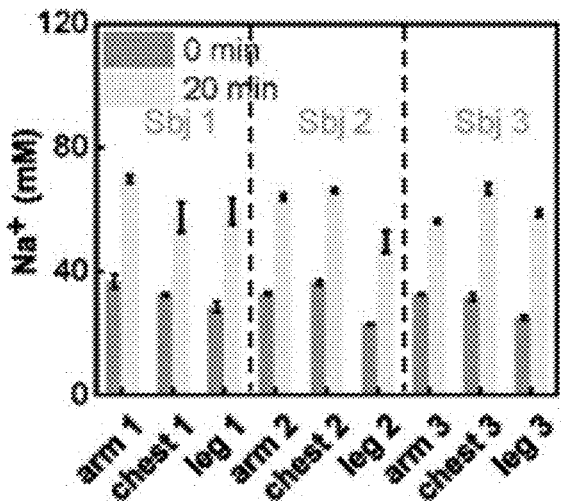
Figure 4E:
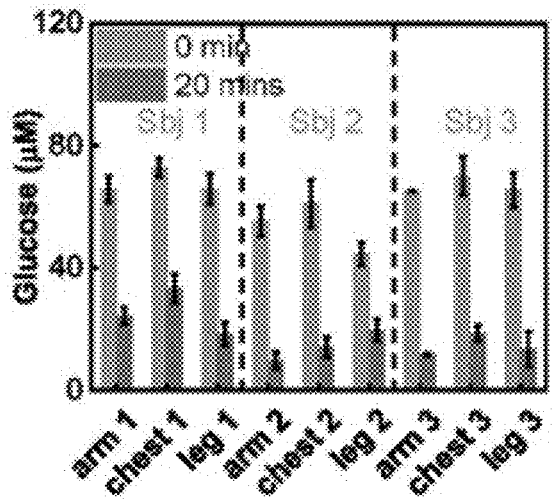

FIGS. 4A-4H shows an implementation embodiment of the present system on running human subjects, where the system is mounted on a corresponding volunteer's arm for recording his physiological information during running on the spot, including $NH_4^+$, $Na^+$, glucose, pH, skin impedance and skin surface temperature. As seen in FIG. 4A, to well present the operation status of the electronics, a thin transparent PDMS is used to encapsulate the other parts of the present system, in particular, the FPCB with the electronic elements soldered on. To read the real-time biomarker signals, a wired connection between the electronic and a personal computer is adopted with the six physiological signals shown in FIG. 4B. In some other embodiments, the present system can incorporate a wireless communication module and utilize a corresponding protocol to transmit the recorded signal data to and receive any feedback or instructions from a paired device or system external to the present system. This wireless communication module and corresponding protocol can be anything known by a skilled person in the art for achieving the same purpose. During a 20-minute continuous operation, $NH_4^+$, $Na^+$ concentrations and arm skin temperature increases with the increased amount of the generated sweat (0.09 to 0.97 mM @ $NH_4^+$, 32.6 mM to 55.9 mM @ $Na^+$, 21.7° C. to 22.2° C. @ temperature sensor), which results from high $NH_4^+$ and $Na^+$ concentrations in fresh sweat and much heat generated from body insides during exercising. At the first 200 seconds, the glucose concentration in the target skin area stabilizes around 66.7 μM, then starts to drop to 13.4 μM at 1200 s, which is induced by the extensively increased sweat at 200 s, starting to dilute the concentration. Different from the former four biomarkers, pH and skin impedance decrease with an increasing sweat volume along the whole process, ranging from 6.65 to 5.9 @ pH, and 2.25~0.89 MΩ @ impedance sensor. It is clear that at the first 200 seconds, the skin impedance rapidly drops from 2.25 MΩ to 1.38 MΩ, resulting from that a small quantity of water in fresh sweat could significantly decrease the skin impedance.

Figure 4F:
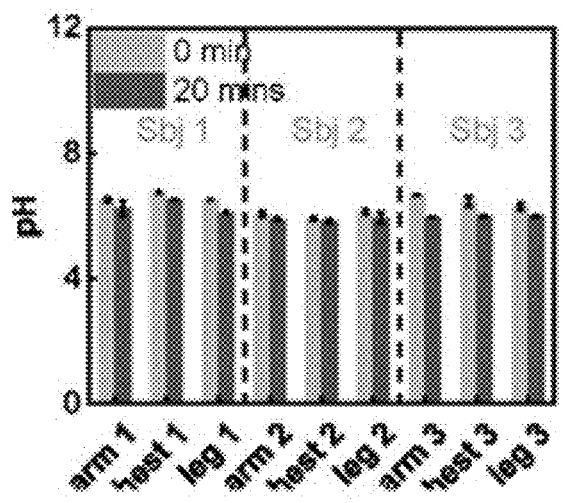
Figure 4G:
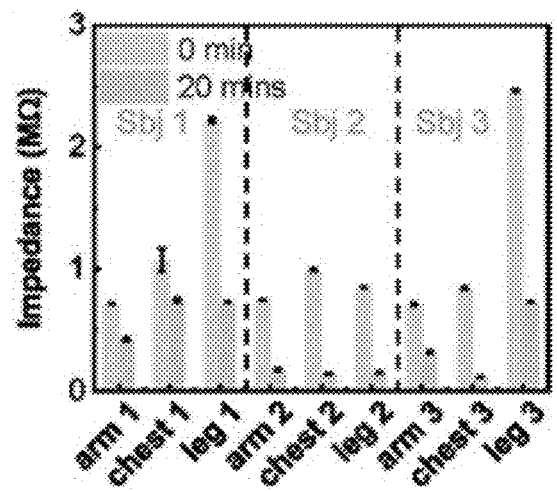
Figure 4H:
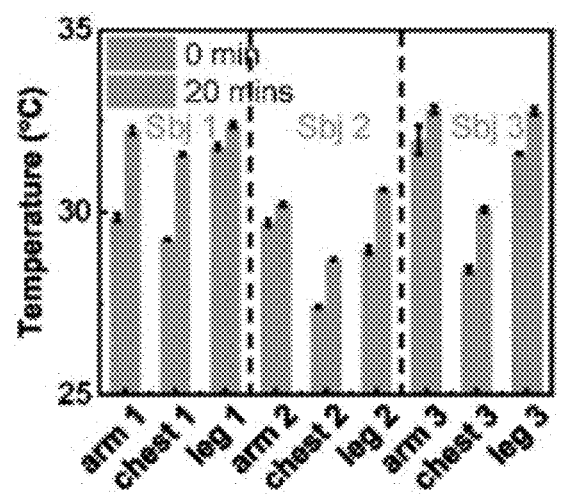

FIGS. 4C-H respectively show sweat $NH_4^+$, $Na^+$, glucose, pH, skin impedance, and skin surface temperature levels measured 20 mins after running on the spot, compared to the initial values at three volunteers' arm. From these results, it is found that $NH_4^+$, $Na^+$, and skin temperature levels at 20 min are higher than that at 0 min, which is consistent with the results shown in FIG. 4B and previous studies. As seen in FIG. 4F, pH levels at the beginning and at the 20$^{th}$ min for the three volunteers show a minor variation. Apart from the four biosensors, glucose concentration and skin impedance (FIGS. 4D & 4G) both show a negative correlation to the exercise time, consistent to the results in FIG. 4B. These results suggest the potential of the present system in monitoring users' physiological signals by analyzing sweat component concentrations with a simultaneous feedback signal mechanism in the absence of any instructions or feedback mechanism transmitted from external devices such as smartphones and smart watches, etc. Benefitting from the high reliability, stability, long operation time, and multiple biochemical signals detection, the present system exhibits great potential in intelligent skin-integrated electronics for healthcare monitoring.

The following non-limiting examples are intended to assist the understanding of certain embodiments of the present invention. Scope of the present invention should be referred to the appended claims.

Example 1—Fabrication of Biomarker Sensing Platform

The fabrication of biomarker sensing platform as a sensor patch started on a PI (150 μm) sticked on a glass. The film was firstly cleaned by deionized water, ethanol and acetone accordingly. A layer of Cr/Au (10 nm/100 nm) was then coated on the cleaned PI film by Ebeam. To obtain a specific pattern of the sensor patch, a photoresist layer (AZ 4620, AZ Electronic Materials) was spin-coated at 3000 rpm for 30 s, baked on a hot plate at 110° C. for 5 mins, exposed to ultraviolet light for 45 s, and developed for 1 min in a solution (AZ 400K) accordingly. Finally, redundant Au and Cr were etched, followed by washing with acetone to remove residual photoresists, to obtain a patterned electrode layer. For fabricating glucose, pH and various ion biosensors, platinum black, PANI and PEDOT:PSS were respectively electrodeposited onto the corresponding positions of the patterned electrode layer. In particular, platinum black was electrodeposited at a constant voltage of −0.8 V for 150 s in an electrolyte consisting of 24 mM chloroplatinic acid and 2.1 mM lead acetate; the PANI was electrodeposited by the cyclic voltammetry method for 20 cycles from −0.2 V to 1V in the mixture solution of 0.1 M aniline and 1 M $H_2SO_4$; and the PEDOT:PSS layers were obtained by constant current electrodeposition (1 mA/cm$^2$) for 15 mins in a solutions containing 0.01 M 3,4-ethylenedioxythiophene (EDOT) and 0.1 M polystyrene sulfonate (NaPSS). More specifically, the electrodeposition process was carried out in a three-electrode system: Au electrode was a working electrode; platinum wire and Ag/AgCl were counter and reference electrodes, respectively. 2 μL mixture solution of glucose oxidase (GOx) (2.5 U/μL), chitosan (1 mg/mL) and carbon nanotubes (2 mg/mL) was dropped on the platinum black layer to be the sensing electrode for glucose biosensor; 2 μL ion-selective solutions for $NH_4^+$ and $Na^+$, respectively, were dropped on corresponding electrodes to form the ion-selective membranes. In particular, the solution for $NH_4^+$ was obtained by dissolving the 200 mg mixture of nonactin (1% w/w), sodium tetrakis [3,5-bis(trifluoromethyl)phenyl] borate (Na-TFPB, 0.55% w/w), polyvinyl chloride (PVC, K-value 72-1, 33% w/w), and bis(2-ethylehexyl) sebacate (DOS, 65.45% w/w) in 1.2 mL of tetrahydrofuran; the $Na^+$ ion-selective solution is formed by replacing nonactin with Na ionophore X. Finally, the commonly used reference electrode was achieved by printed Ag/AgCl ink.

Example 2—Fabrication of Microfluidics for Sweat Collection

The fabrication of microfluidic based sweat collection module was based on photolithography method and replica molding of PDMS. Initially, the mold was fabricated by patterning SU-8 photoresist (SU-8 2015, Microchem) with a thickness of 20 μm on a 4" silicon wafer, followed by washing with isopropyl alcohol, acetone, DI water, and a final rinse with isopropyl alcohol. After soft baking at 95° C. for 3 mins on a hot plate, the coated photoresist was exposed to UV light through mounting to a photomask, then sent to post baking at 95° C. for another 3 mins. The exposed substrate was immersed in the developer solution (SU-8 developer, Microchem) for 5 mins to remove any unexposed photoresist. Next, the mold was salinized by depositing a molecular layer of Trichloro (1H,1H,2H,2H-perfuorooctyl) silane (Sigma-Aldrich, St. Louis, MO, USA) to facilitate the release of PDMS from the mold master. After the mold fabrication, the PDMS monomer was mixed with the curing agent in a weight ratio of 15:1; and the mixture was degassed for 5 mins. The degassed PDMS mixture was poured onto the control layer mold with a thickness of 250 μm. After baking at 70° C. for 30 mins, the PDMS substrate was cut and peeled from the wafer. The inlet was obtained by punching holes of 1.5 mm diameter, and the outlet was developed by cutting the extra PDMS at the end of the microchannels. Finally, the PDMS substrate was bonded onto the PI supporting substrate of the sensing layer using oxygen plasma treatment (energy: 5 kJ; Harrick plasma cleaner PDC002) for 2 mins and baked at 70° C. for 15 mins to enhance the adhesion between the PDMS and PI layer.

Example 3—Fabrication of Mechanical Actuator

Figure 1E:
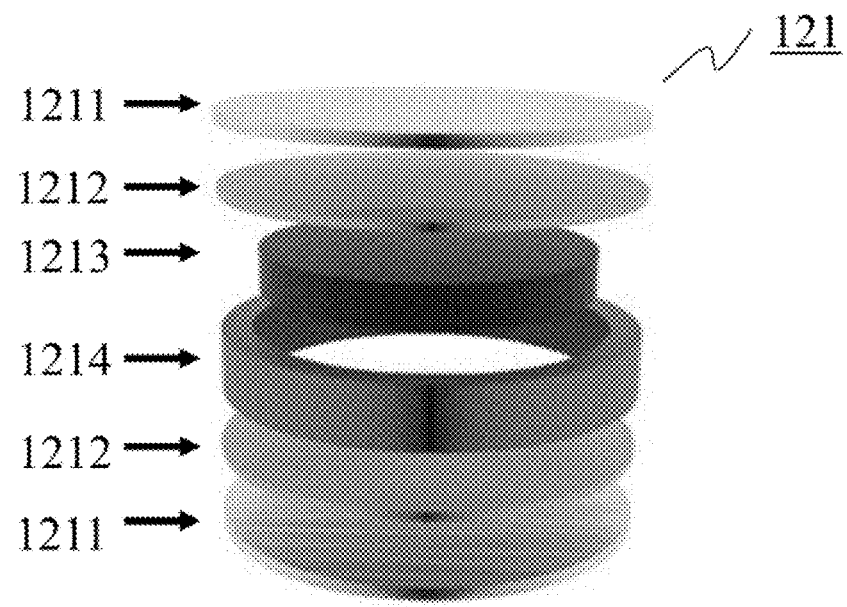

Reference is made to the structure depicted in FIG. 1E. Firstly, the Cu coil was fabricated by 0.5 mm-thick Cu wires to form the electromagnet coil with a thickness of 0.25 mm (Yisu Electronics, Inc., Dongguan China). The inner diameter was 2 mm, and the outer diameter was 11 mm. The supporting epoxy ring was 3D printed at a constant thickness of 1.9 mm. The adopted magnet diameter was 8 mm. 0.2 mm-thick PET films were cut into circles with a diameter of 11 mm by a laser cutting machine. At first, a Cu coil was fixed on a clean glass sheet, then a PET film was glued onto the top of the coil. After the glue was cured in 80° C. for 1 min, the epoxy ring was bonded onto the PET film by a quick-drying glue. The magnet was placed inside the hollow space of the ring, then the chamber was sealed with the PET layer. After bonding the top Cu coil on the PET, the actuator was acquired.

In terms of the mechanical analysis, the FEA commercial software ABAQUS (Analysis User's Manual 2020) was used to obtain the impact resistance capacity of actuator. The Cu, PET, epoxy and magnet were modelled by 0.86 million hexahedron elements (C3D8R). The minimal element size was 0.002 mm, which ensured the convergence and the accuracy of the simulation results. The uniformly distributed force with a pressure of 5.53 MPa was applied on the top surface of the actuator and the magnet was set as rigid body. The elastic modulus (E) and Poisson's ratio (v) used in the analysis were $E_{Cu}$=131 GPa, $v_{Cu}$=0.33, $E_{PET}$=3.5 GPa, $v_{PET}$=0.35, EEpoxy=3.35 GPa, $v_{Epoxy}$=0.35.

Example 4—Fabrication of Integrated Sweat Sensing System

Fabrication of the present integrated sweat sensing system started from the circuits fabricated by flexible printed circuit board processing techniques on copper (with a thickness of ~10 m) plated with gold (with a thickness of ~50 nm) on a PI substrate. An insulating layer was covered onto the exposed circuit for preventing short circuit. All electrical elements were soldered onto the flexible printed circuit board (FPCB), including the microcontroller (ATmega328p-mu), capacitors (14~22 pF), resistors, crystal oscillator (16 MHz), a connector, LEDs, and the mechanical actuator, to corresponding contact pads on the Cu/PI substrate. Two strips were integrated in the control panel of the FPCB for ensuring the close contact between human skin and the sensing layer of the system. To enhance the resistance to the tear strength induced by the strips, a customized hard printed board was adopted to fix on the two opposite sides of the FPCB by a quick-drying glue, then encapsulated by PDMS (PDMS:crosslink=10:1), and cured in 80° C. for 10 mins. Finally, two conductive double-sided tapes (3J Plain Double-sided Conductive Tape, Dongguan Xinshi Packaging Material Co., Ltd) each with a constant size of 1 cm×1 cm were pasted onto the exposed Cu patches on the bottom side of the control panel.

Example 5—Operation of Integrated Sweat Sensing System

Since the present integrated sweat sensing system is mainly composed of two sensing regions which are sweat sensor array (for sensing ions such as $NH_4^+$, $Na^+$; glucose; and pH) and the control panel (circuitry region) on the FPCB for processing data and measuring skin impedance and temperature, in this example, a programmable MCU (ATMEGA328P-MU, Microchip Technology Inc.) was applied while the whole system was powered by an external 5 V battery. During operation, analog signals obtained by the sensor arrays were converted to digital signals by exploiting the 10-bit ADC function of the MCU. In addition, as the amplitudes of the analog signals resulting from the sweat sensors were small in a range of millivolts, the signals passed through an instrumentation amplifier (INA321EA/250, Texas Instruments Inc.) prior to the ADC step for achieving the accurate measurement. Furthermore, to measure both positive and negative signals from the sensors, 3.3 V that can directly be stepped down from 5V through a LDO (TPS76933DBVR, Texas Instruments Inc.) was applied to the original signals and the values were calculated back internally in the MCU. For sensing skin impedance and temperature, two separate copper pads directly contacting the bare skin of an individual and a negative temperature coefficient (NTC) thermistor installed on the control panel were employed. Similar to the sweat sensor array, the signals from the skin sensors were converted into digital signals through ADC pins of the MCU and processed in the MCU. Lastly, for generating mechanical and visual warning functions, an actuator was activated by the forward and reverse current direction functions of a H-Bridge (BD6211F-E2, ROHM Semiconductor) and 6 bicolor LEDs (green and red) were employed to indicate the status of each parameter in real-time while they were controlled by the digital pins of the MCU in real-time.

Although the invention has been described in terms of certain embodiments, other embodiments apparent to those of ordinary skill in the art are also within the scope of this invention. Accordingly, the scope of the invention is intended to be defined only by the claims which follow.

INDUSTRIAL APPLICABILITY

The present invention provides a flexible, bendable and reliable health status monitoring system with at least six integrated electrochemical sensors for real time tracking and analyzing human sweat components, skin impedance, and surface temperature, whose sensing signal can be associated with an embedded mechanical vibration-based actuator and six changeable emitting colors LEDs as feedback modules. The biosensors exhibit great sensing performances and outstanding mechanical properties in sensitivity, anti-interface capacity, and reliability. The microfluidic module of the present invention configured with a hydrophilic surface for sampling can greatly enhance sweat collection efficiency and avoid the sweat contamination. Apart from the sensors, the wearable mechanical actuator is provided with a high pressure (0.43 kPa) generated at a square-wave current of 63.75 mA, and also exhibits high stability, thereby being capable of operating under a distributed stress over 7.52 MPa. Demonstrations in real time recording of six human physiological signals during exercise also prove the potentials of the present invention in various practical applications, ranging from entertainment, healthcare, and medical treatment.

What is claimed is:

1. An integrated sweat sensing system comprising a multi-layered structure, the multi-layer structure comprising:
an adhesive layer configured for enhancing adhesion of the integrated sweat sensing system to a contact surface of human skin of a user;
a sensing layer; and
an encapsulation layer configured for encapsulating the sensing layer,
wherein the sensing layer comprises:
a flexible printed circuit board (FPCB), on which a plurality of electronic and mechanical components are disposed comprising:
a mechanical actuator configured for outputting a vibrating signal to the user;
a microcontroller (MCU); and
a plurality of light emitting diodes (LEDs) configured for emitting visual signals for indicating whether detected physiological signals are in a normal range,
a biomarker sensing platform comprising:
an electrode layer;
a microfluidics comprising a microfilter configured for sweat filtration and a plurality of microchambers configured for biomarker signal monitoring; and
a plurality of biosensors configured for sensing $NH_4^+$, $Na^+$, pH and glucose,
wherein the microfilter is configured to be an interface between the microfluidics and a human skin contact surface, and a plurality of microchannels connect corresponding microchambers together and connect microchambers with the microfilter,
wherein the mechanical actuator is a bilateral electromagnetic coil structure comprising two copper coils, each attached with a polyethylene terephthalate film to seal a magnet enclosed by an epoxy ring.

2. The system of claim 1, wherein the biomarker sensing platform is configured to be flexible and detachably mountable on the human skin contact surface of the user.

3. The system of claim 1, wherein the biomarker sensing platform is integral to the FPCB forming a continuous layer with a circuitry region of the FPCB on which the plurality of electronic and mechanical components are soldered; or the biomarker sensing platform is detachably connected to a circuitry region of the FPCB on which the electronic and mechanical components are disposed.

4. The system of claim 1, wherein the electrode layer of the biomarker sensing platform is made of two metals including gold and chromium, and is patterned.

5. The system of claim 1, wherein the electrode layer of the biomarker sensing platform is supported by a substrate made of polyimide (PI).

6. The system of claim 1, wherein each of the plurality of microchambers has a hydrophilic interior surface configured to increase a flow rate of sweat obtained from the human skin contact surface via the plurality of microchannels towards corresponding biosensors.

7. The system of claim 4, wherein the plurality of biosensors are formed on the patterned electrode layer by an initial electrodeposition of platinum black, polyaniline (PANI) and poly(3,4-ethylenedioxythiophene)-poly (styrenesulfonate) (PEDOT:PSS), respectively, to form different membranes on patterned electrodes, followed by subjecting different patterned electrodes to corresponding mixtures to form either an ion-selective membrane for sensing a corresponding ion or a sensing electrode for sensing glucose.

8. The system of claim 1, wherein the microfluidics of the biomarker sensing platform is made of a thermosetting polymer and fabricated based on photolithography and replica molding.

9. The system of claim 1, wherein the plurality of microchannels has an average channel width of about 15 μm.

10. The system of claim 1, wherein the plurality of microchambers is five cylindrical chambers having an average diameter of about 2 mm and being connected to each other through the plurality of microchannels.

11. The system of claim 1, wherein the microfilter is disposed at an inlet of the microfluidics and composed of an array of micropillars each having a height of about 20 μm, a side length of about 40 μm, a center-to-center distance between two adjacent micropillars of about 90 μm, and a gap distance between each micropillar and the sidewall of its adjacent microchannel is about 18 μm.

12. The system of claim 1, wherein the electronic and mechanical components further comprise a temperature sensor, an impedance sensor, an amplifier, a crystal oscillator, resistors, capacitors, and an internal battery.

13. The system of claim 1, further comprising at least two elastic strips respectively being affixed on two opposite sides of the sensing layer adjacent to where the biomarker sensing platform is integrated or detachably connected thereto configured for securing the integrated sweat sensing system to the contact surface of the human skin of the user.

14. The system of claim 1, wherein the encapsulation layer is configured to enclose at least a top surface of the sensing layer and the electronic and mechanical components disposed thereon.

15. The system of claim 1, wherein the adhesive layer is a replaceable adhesive layer composed of one or more conductive double-sided adhesive tapes where one side of the double-side adhesive tapes configured for adhering to the human skin contact surface and the other side thereof adheres to a bottom surface of the sensing layer.

16. A real-time, non-invasive method for monitoring physiological changes of an individual at various states, comprising:

securing the integrated sweat sensing system according to claim 1 on one or more skin regions of the individual;

activating a power supply of the integrated sweat sensing system;

calibrating each of the biosensors of the biomarker sensing platform with a referenced reading of a biological, chemical, or physiological signal in order to pre-set a threshold of the biological, chemical or physiological signal;

outputting a first feedback signal indicating a normal state of the individual when detected signals are within the pre-set threshold; and outputting a second feedback signal and generating a simultaneous vibrational signal via the mechanical actuator when a detected signal exceeds the pre-set threshold, thereby indicating an abnormal state.

17. The method of claim 16, wherein biological, chemical, or physiological signals detectable by the corresponding biosensors comprise ions, glucose, pH, temperature and humidity, and wherein the ions comprise ammonium cations ($NH^{4+}$) and sodium ($Na^+$) ions.

18. The method of claim 17, wherein changes in concentration of the ions, glucose and pH of the sweat as collected are detectable in real-time by electric responses in terms of voltage change of corresponding sensing electrodes of the biosensors; wherein the humidity of one or more regions of the skin is detectable by an impedance sensor incorporated on the FPCB in terms of an inverse relationship between the impedance and the humidity.

\* \* \* \* \*